United States Patent
Marx et al.

(10) Patent No.: US 11,813,655 B2
(45) Date of Patent: Nov. 14, 2023

(54) APPARATUS AND METHODS FOR FORMING ATTACHMENT PADS

(71) Applicant: KUKA Systems North America LLC, Sterling Heights, MI (US)

(72) Inventors: Timothy James Marx, Macomb, MI (US); Thomas William French, Petersburg, MI (US)

(73) Assignee: KUKA Systems North America LLC, Sterling Heights, MI (US)

( * ) Notice: Subject to any disclaimer, the term of this patent is extended or adjusted under 35 U.S.C. 154(b) by 85 days.

(21) Appl. No.: 17/325,554

(22) Filed: May 20, 2021

(65) Prior Publication Data
US 2022/0371073 A1 Nov. 24, 2022

(51) Int. Cl.
| | |
|---|---|
| *B21D 39/03* | (2006.01) |
| *B21D 37/12* | (2006.01) |
| *B25J 19/00* | (2006.01) |
| *B25J 11/00* | (2006.01) |
| *B21D 22/06* | (2006.01) |
| *B30B 15/00* | (2006.01) |

(52) U.S. Cl.
CPC ............ *B21D 37/12* (2013.01); *B21D 22/06* (2013.01); *B25J 11/005* (2013.01); *B25J 19/002* (2013.01); *B30B 15/0064* (2013.01)

(58) Field of Classification Search
CPC ...... B21D 39/03; B21D 39/031; B21D 22/02; B21D 22/04; B21D 22/06; B30B 15/0064
See application file for complete search history.

(56) References Cited

U.S. PATENT DOCUMENTS

| | | | |
|---|---|---|---|
| 2,652,942 | A | 9/1953 | Muchy |
| 3,938,798 | A | 2/1976 | Solie et al. |
| 4,760,633 | A | 8/1988 | Dacey, Jr. |
| 5,133,206 | A | 7/1992 | Jackson |
| 6,292,716 | B1 | 9/2001 | Moore, Jr. et al. |
| 7,100,260 | B2 | 9/2006 | Savoy et al. |
| 7,117,706 | B2 * | 10/2006 | Savoy .................... B21D 28/26 83/688 |

(Continued)

OTHER PUBLICATIONS

U.S. Patent Office; Search Report in related International Patent Application No. PCT/US2022/29828 dated Oct. 4, 2022; 7 pages.

(Continued)

*Primary Examiner* — Debra M Sullivan
(74) *Attorney, Agent, or Firm* — Dorton & Willis, LLP

(57) ABSTRACT

A tool for forming an attachment pad on a sheet material includes an anvil supported on a housing and defining a working axis for forming the pad. A slide block is supported on the housing for movement at least along the working axis, and a die block is supported opposite the slide block and is movable in directions along the working axis to cooperate with anvil to form the pad. At least one actuator on the housing biases the slide block in a direction toward the die block. The actuator is operable in a first mode wherein the slide block is movable toward and away from the die block, and a second mode wherein the slide block is locked against movement in a direction away from the die block. A selectively adjustable counterbalance device cooperates with the actuator to counterbalance a force applied to the slide block by the actuator.

16 Claims, 6 Drawing Sheets

(56) References Cited

U.S. PATENT DOCUMENTS

| | | | |
|---|---|---|---|
| 7,130,714 B1 | 10/2006 | Kulkarni et al. | |
| 9,815,109 B2 | 11/2017 | Savoy et al. | |
| 2004/0144229 A1 | 7/2004 | Savoy et al. | |
| 2008/0016935 A1* | 1/2008 | Rotter | B21D 39/031 |
| | | | 72/470 |
| 2015/0002695 A1 | 1/2015 | Jannard et al. | |

OTHER PUBLICATIONS

U.S. Patent Office; Written Opinion in related International Patent Application No. PCT/US2022/29828 dated Oct. 4, 2022; 11 pages.

* cited by examiner

11,813,655 B2

APPARATUS AND METHODS FOR FORMING ATTACHMENT PADS

TECHNICAL FIELD

The present invention relates generally to the automated assembly of components and, more particularly, to apparatus and methods for forming pads to facilitate joining component parts of an assembly.

BACKGROUND

Robotic manipulators and other computer-controlled machines are increasingly used to automate the assembly of component parts into an end product. As a non-limiting example, the manufacture of automobiles is conventionally accomplished using assembly lines having an increasing number of assembly processes and operations performed by automated machinery. U.S. Pat. No. 7,117,706 to Savoy discloses a tool that can be supported on a multi-axis industrial robotic manipulator for forming attachment pads in sheet material, such as automotive body panels, to facilitate joining component parts to the panels during automated assembly. While the tool disclosed in U.S. Pat. No. 7,117,706 greatly facilitates the formation of pads in sheet material, various aspects of the tool and its operation can be improved. For example, the tool disclosed in U.S. Pat. No. 7,117,706 does not maintain a uniform bias force on the tool's slide block as the pose (orientation and position) of the tool carried by the robotic manipulator changes. Accordingly, articulation of the tool by the robot to reach various target points on sheet material generally results in a wide range of bias forces applied to the slide block.

The previous tool also does not account for "spring-back" that may occur in the sheet material after a pad is formed, nor does the tool provide support for the area of the sheet material around the location where the pad is formed, whereby unwanted deformation or curving of the sheet material may occur. The tool disclosed in U.S. Pat. No. 7,117,706 also does not sufficiently accommodate off-plane orientation of incoming sheet material into which a pad is to be formed. The ability of the tool to repeatably and accurately locate the sheet material relative to the slide block may also be improved, thereby enabling fine adjustment of the target height of the pad to be formed. Accordingly, there is a need for an improved tool and methods for forming pads in sheet material that overcomes these and other drawbacks of conventional pad forming devices.

SUMMARY

The present invention provides improved apparatus and methods for forming pads in sheet material to facilitate joining component parts. While the invention will be described in connection with certain embodiments, it will be understood that the invention is not limited to these embodiments. On the contrary, the invention includes all alternatives, modifications, and equivalents as may be included within the spirit and scope of the present disclosure. In one embodiment, a tool for forming an attachment pad on a sheet material includes an anvil supported on a housing and defining a working axis for forming the pad. A slide block is supported on the housing for movement at least along the working axis, and a die block is supported opposite the slide block and is movable in directions along the working axis to cooperate with anvil to form the pad. At least one actuator on the housing biases the slide block in a direction toward the die block. The actuator is operable in a first mode wherein the slide block is movable toward and away from the die block, and a second mode wherein the slide block is locked against movement in a direction away from the die block. A selectively adjustable counterbalance device cooperates with the actuator to counterbalance a force applied to the slide block by the actuator. In one aspect, a counterbalance force of the counterbalance device may be adjustable based on a pose of the tool. In another aspect, the counterbalance force may be adjustable based on a predetermined force limit that can be applied by the slide block to the sheet material.

In another embodiment, an exemplary tool for forming an attachment pad in sheet material may further include a sensor supported on the housing and configured to sense a position of the slide block, or a face plate supported on the slide block, relative to the housing. The relative position of the slide block or face plate may then be used to control operation of the tool to form the attachment pad by adjusting the relative positions of the slide block and/or the anvil. In another embodiment, the tool may further include a workpiece clamp on the die block and cooperating with the face plate to clamp sheet material therebetween when the die block is moved along the working axis to engage the anvil. In yet another embodiment, the slide block may be supported on the housing for movement along the working axis of the anvil, and for further movement in at least two more degrees of freedom.

In another embodiment, a method of forming an attachment pad on a sheet material includes positioning a pad forming tool such that the sheet material is disposed between a die block and a slide block of the tool, applying a bias force to the slide block with an actuator to bias the slide block in a direction toward the die block, and applying a selectively adjustable counterbalance force against the bias force to achieve a net force acting on the slide block. The forming tool may then be moved to contact the sheet material with the slide block of the tool. In one aspect, the selectively adjustable counterbalance force may be selected based on a pose of the tool. In another aspect, the selectively adjustable counterbalance force may be selected based on a predetermined force limit that can be applied by the slide block to the sheet material.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
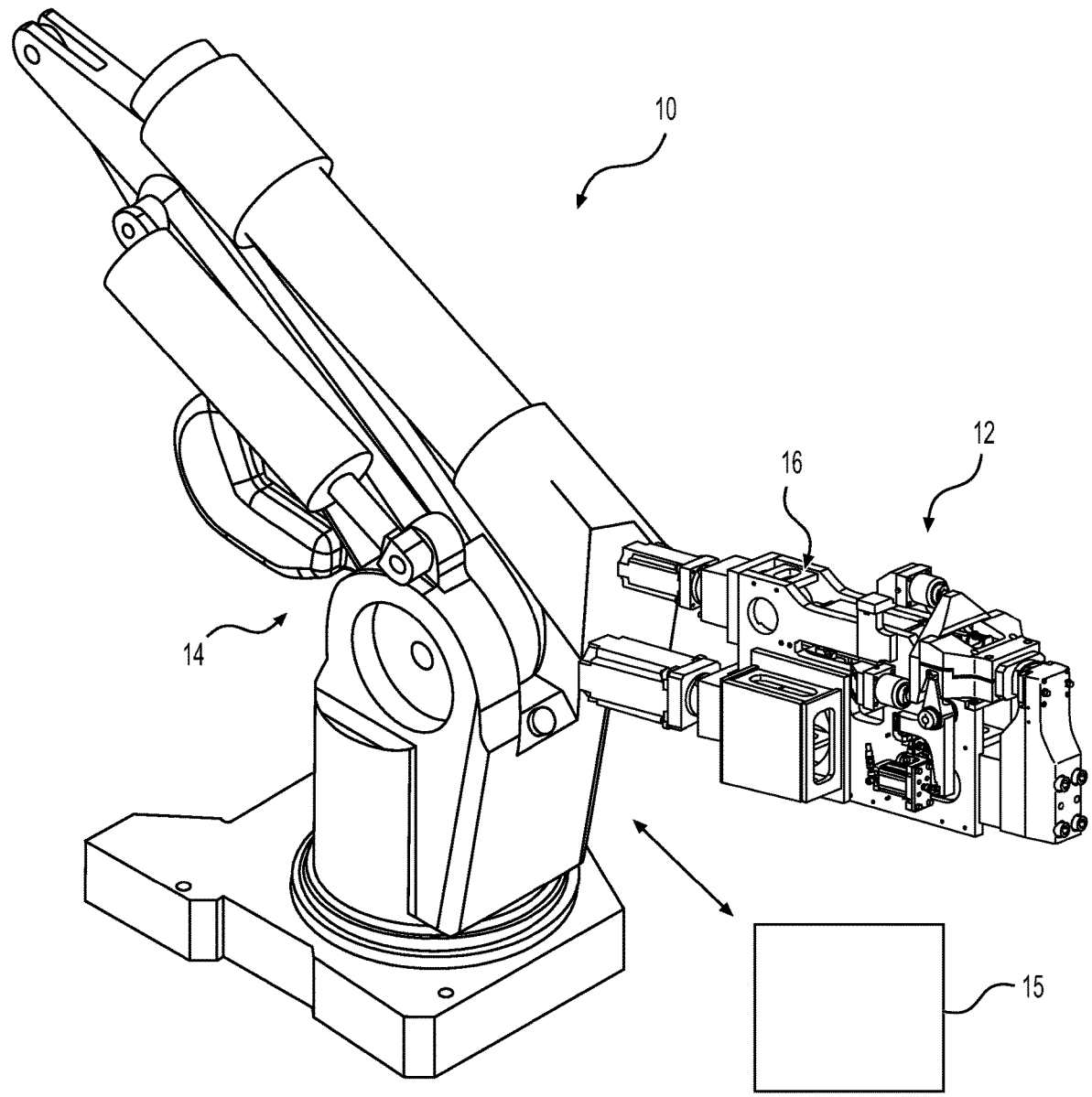
FIG. 1 is a perspective view of an exemplary system for forming attachment pads in sheet material, including an exemplary pad forming tool in accordance with the principles of the present disclosure.

FIG. 1 depicts an exemplary system 10 for forming attachment pads in sheet material, including an exemplary pad forming tool 12 in accordance with the principles of the present disclosure supported by a multi-axis industrial robotic manipulator 14. The tool 12 shown and described herein is similar in many aspects to the pad forming tool disclosed in U.S. Pat. No. 7,117,706 to Savoy, which is incorporated by reference herein in its entirety. Operation of the robotic manipulator 14 and tool 12 may be controlled by one or more programmable controllers 15 associated with the robotic manipulator 14, the tool 12, or the system 10. Accordingly, the description of tool 12 herein focuses primarily on the differences that provide improved performance and operation of the tool 12 to form mounting pads in sheet material.

Figure 2:
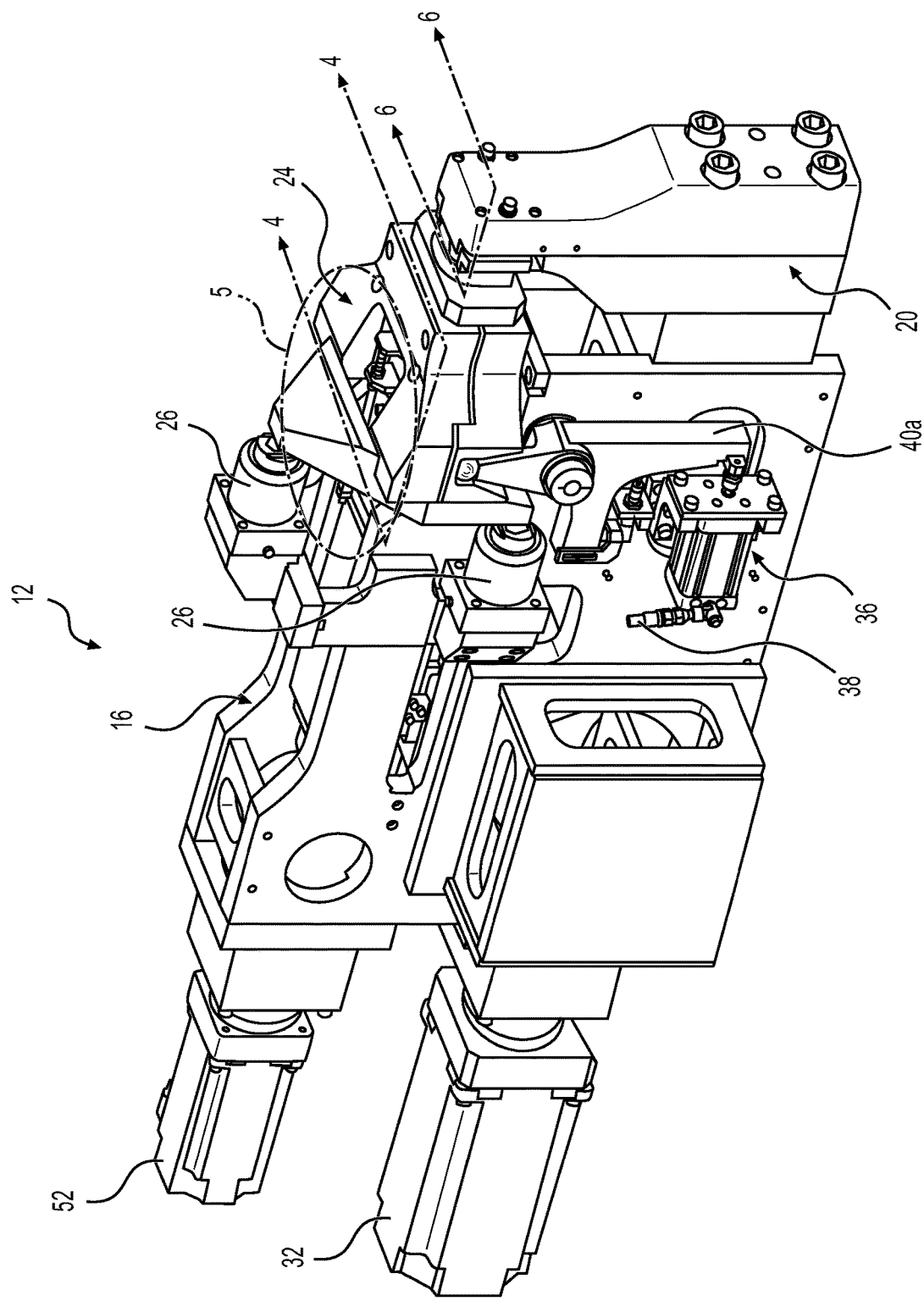
FIG. 2 is an enlarged perspective view of the exemplary tool of FIG. 1.
Figure 3:
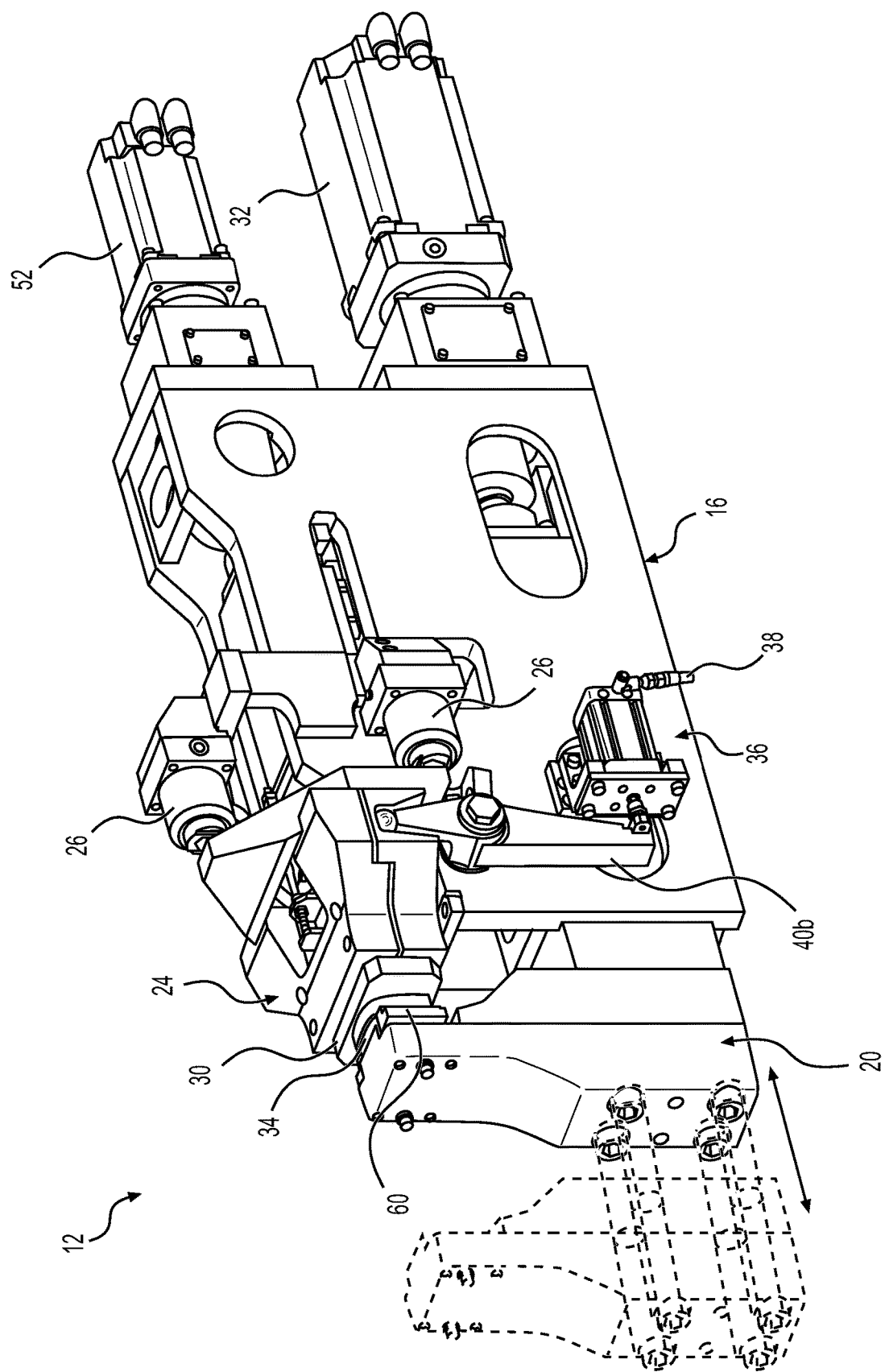
FIG. 3 is a perspective view of the tool of FIG. 2, viewed from a different angle.
Figure 4:
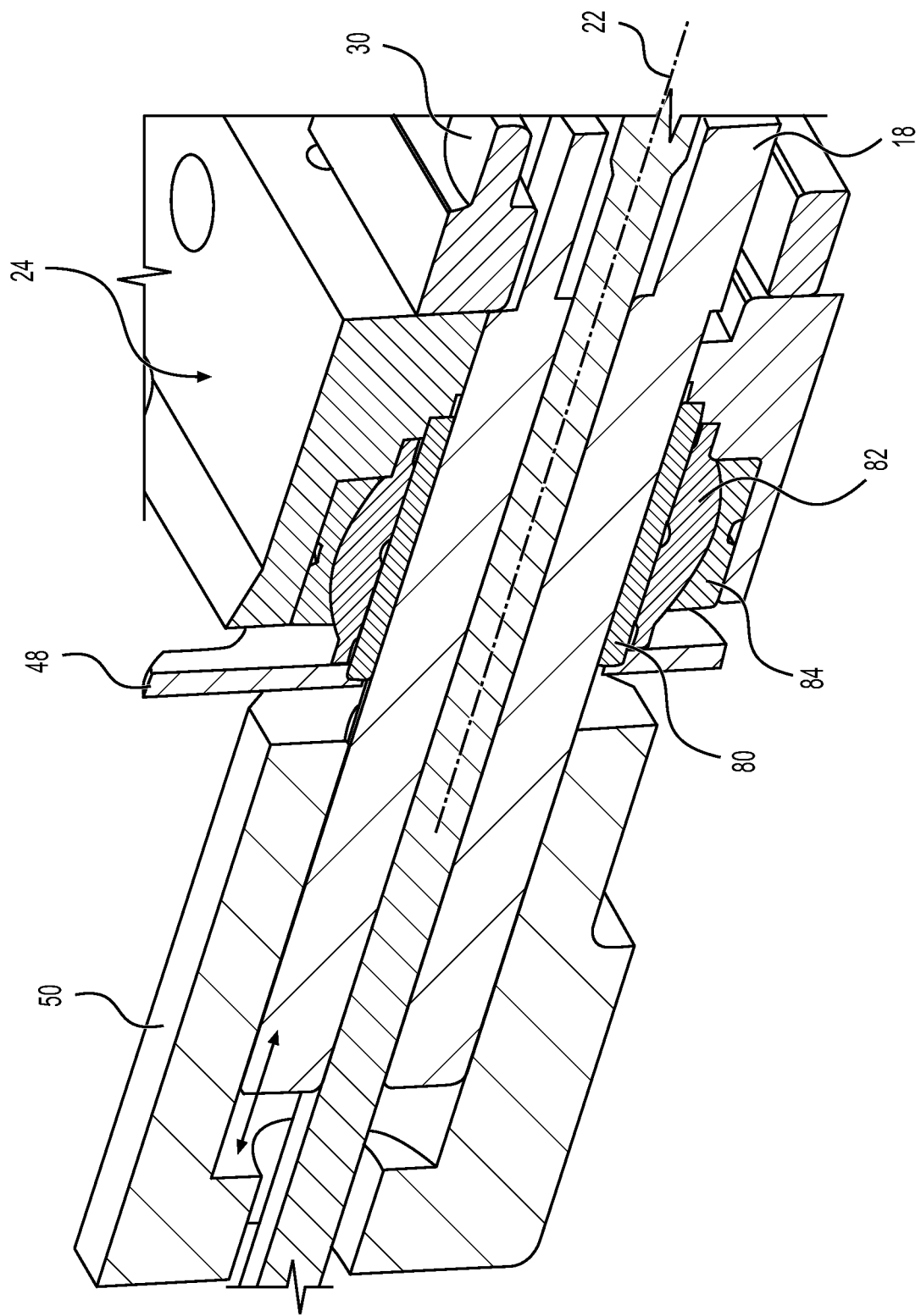
FIG. 4 is an enlarged section view taken along line 4-4 of FIG. 2.

Similar to the tool shown and described in U.S. Pat. No. 7,117,706, tool 12 includes a housing 16 for supporting the various components of the tool 12 and facilitating attachment of the tool 12 to the robotic manipulator 14. With reference to FIGS. 2-4, the housing 16 supports an anvil 18 against which the sheet material is engaged and deformed by a die block 20 to thereby form the attachment pad. The die block 20 is supported on the housing 16 and is slidably movable relative to the housing 16 in directions along the working axis 22 of the anvil 18 (see FIG. 4). The tool 12 further includes a slide block 24 positioned generally opposite the die block 20 and supported on the housing 16 for movement at least along the working axis 22 of the anvil 18. One or more actuators 26 carried on the housing 16 bias the slide block 24 in a direction toward the die block 20 for engagement with the sheet material, as generally described in U.S. Pat. No. 7,117,706. The actuators 26 in this embodiment are operable in a first mode, wherein the slide block 24 may be moved toward and away from the die block 20, for example, during initial engagement with the sheet material, and a second mode wherein the slide block 24 may be locked against movement in a direction away from the die block 20. In the locked, second mode of the actuators 26, the slide block 24 may cooperate with the die block 20 and the anvil 18 to form the pad. In operation, the tool 12 is moved by the robotic manipulator 14 to a location on the sheet material where the pad is to be formed. With the slide block 24 biased toward the die block 20, the robotic manipulator 14 then moves the tool 12 until the face plate 30 on the side block 24 makes initial contact with the sheet material. Continued movement of the tool 12 toward the sheet material moves the slide block 24 against the bias force of the actuators 26, in a direction away from the die block 20. Thereafter, the actuators 26 may be switched to the second mode, thereby locking the slide block 24 against further movement in a direction away from the die block 20. A first servomotor 32 supported by the housing 16 may then be actuated to move the die block 20 toward the anvil 18 and slide block 24 so that the sheet material is engaged by a forming die 34 carried on the die block 20, and is deformed against the face plate 30 and the anvil 18 to thereby form the attachment pad.

In the embodiment shown, the tool 12 further includes at least one selectively adjustable counterbalance device 36 configured to provide a counterbalance force that offsets the bias force applied to the slide block 24 by the one or more actuators 26. In this embodiment, two counterbalance devices 36 are supported on opposite sides of the housing 16. The exemplary counterbalance devices 36 comprise controllable air spring cylinders, Model No. 300200-1 available from Airpot Corporation, Norwalk, Conn. Accordingly, the amount of force applied by the counterbalance devices 36 can be controlled by varying the air pressure provided to the inlets 36 of the devices 36. The tool 12 may further include a pair of lever arms 40a, 40b pivotally supported on opposite sides of the housing 16, and extending between the counterbalance devices 36 and the slide block 24. In this manner, the lever arms 40a, 40b may be used to transfer forces from the counterbalance devices 36 to the slide block 24 to counterbalance the bias forces applied by the actuators 26, as may be desired. In another embodiment, the lever arms 40a, 40b may be positioned between the counterbalance devices 36 and the actuators 26 to more directly counterbalance the bias forces of the actuators 26.

In one embodiment, the counterbalance forces applied by the counterbalance devices 36 may be varied based on a pose of the tool 12 supported on the robotic manipulator 14. The pose may be determined based on kinematics of the manipulator 14, model data for the manipulator 14, or on sensor data obtained during operation of the robotic manipulator 14, for example. In other embodiments, the counterbalance forces applied by the counterbalance devices 36 may be varied based on other parameters such as, for example, the dimensions of the sheet material or the material properties of the sheet material. Alternatively, the forces applied by the counterbalance devices 36 may be selected to offset the bias forces applied by the actuators 26 to thereby limit the amount of force that is applied to the sheet material by the face plate 30 that is carried by the slide block 24. While the counterbalance devices 36 have been shown and described herein as comprising one or more controllable air springs, it will be appreciated that various other controllable devices that are suitable for varying the amount of force effectively applied to the slide block 24 by the actuators 26 may alternatively be used.

Figure 5:
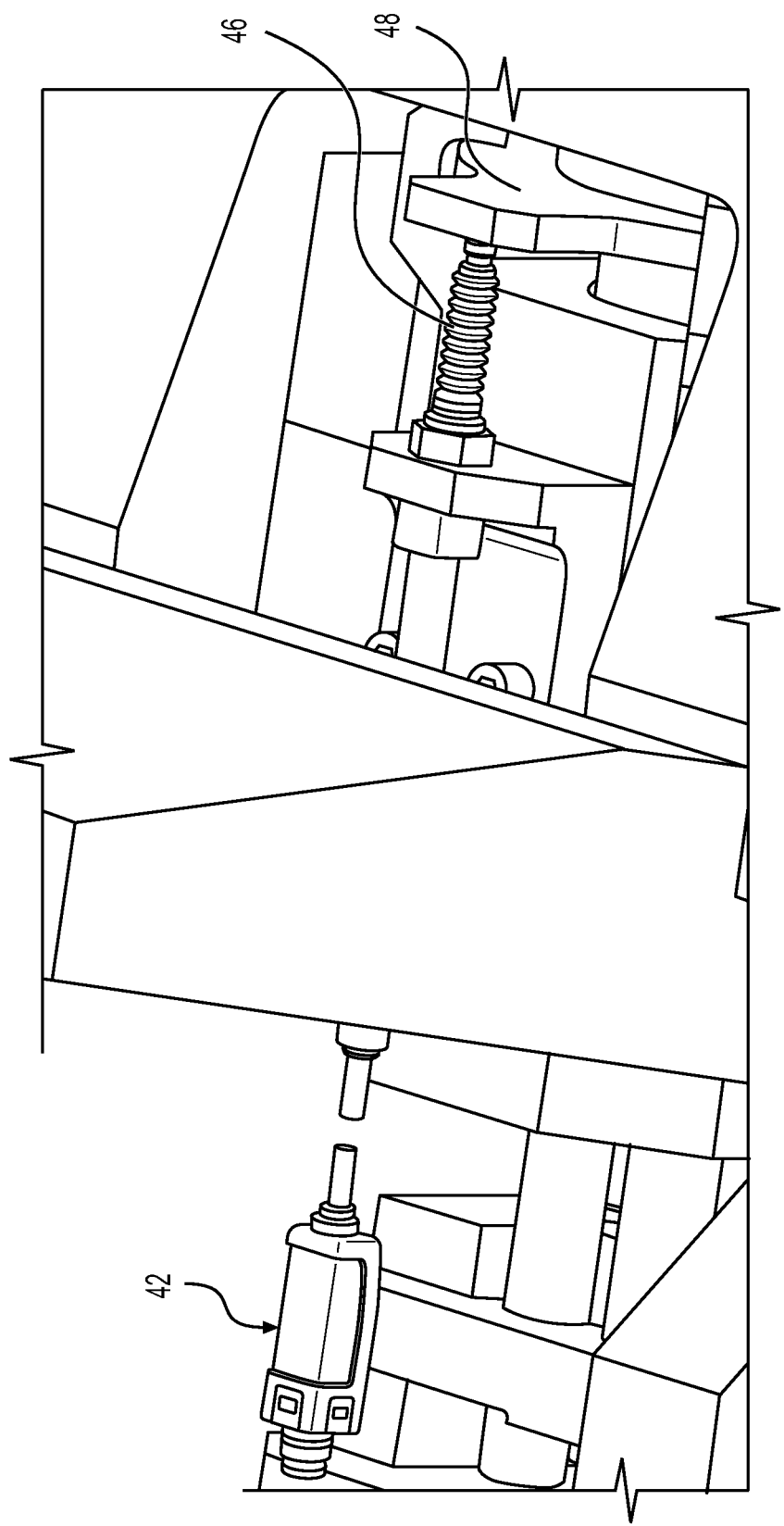
FIG. 5 is an enlarged section view taken along line 5-5 of FIG. 2.

With continued reference to FIGS. 2-3, and referring further to FIG. 5, the exemplary tool 12 may further include a sensor 42 supported on the housing 16 and configured to sense a position of the slide block 24 and/or face plate 30 relative to the housing 16. In the embodiment shown, a position sensor 42, such as stylus-type sensor Model No. GT2-P12F, available from Keyence Corporation of America, Itasca, Ill., is supported on a sensor bracket (not shown) coupled with the housing 16 and located a distance behind the slide block 24. A probe 46 associated with the position sensor 42 extends in a direction toward the slide block 24, generally along an axis aligned with the working axis 22 of the anvil 18, and is coupled to a sensor tab 48 associated with the slide block 24 or the face plate 30. The sensor tab 48 may be integral with the slide block 24, or may be a separate bracket coupled to the slide block 24 or structure associated with the slide block 24 to facilitate attachment of the sensor probe 46. In one embodiment, the sensor tab 48 may be coupled with a portion of a roller bearing 80 that supports the slide block, as described more fully herein. As the slide block 24 is moved relative to the housing 16, such as by the bias force of the actuators 26, the counterbalance force of the counterbalance devices 36, and/or by contact of the slide block 24 with a workpiece, movement of the slide block 24 and/or face plate 30 is detected by the sensor 42. The sensed movement of the slide block 24 may then be used to accurately and continuously determine the location of the slide block 24 relative to the housing 16, and/or the location of the face plate 30 which is fixed to the slide block 24. Advantageously, information about the relative position of the face plate 30 may be used to improve the performance of the pad forming tool 12. For example, the relative position of the face plate 30 may be determined at the moment that the face plate 30 engages the sheet material, and a parameter may be established with respect to the sheet material from the determined position. In some embodiments, the relative position of the face plate 30 determined when the face plate 30 first engages the sheet material may indicate that the initial location of the sheet material exceeds desired manufacturing tolerances, and a signal may be generated to indicate that the desired tolerance threshold is being approached, or has been exceeded, so that adjustments to the incoming sheet material and/or production processes may be performed. Determining or establishing the parameter with respect to the sheet material, and generating a signal, may be performed by the one or more controllers 15 or any other suitable devices.

In another embodiment, the determined position of the face plate 30 may be used to adjust the relative positions of the face plate 30 and anvil 18, such as by controlling the locked position of the slide block 24 with the actuators 26 to thereby account for "spring-back" of the sheet material after the pad has been formed. For example, the relative positions of the face plate 30 and the anvil 18 may be adjusted so that the formation of the pad is overdrawn by an amount calculated to accommodate predicted or determined spring-back of the material so that the height of the resulting pad is in a desired range.

While accounting for the spring-back of the sheet material can be accomplished by controlling the position of the face plate 30 using the actuators 26 to set a desired stop/lock position, in another embodiment, the anvil 18 may additionally, or alternatively, be selectively moveable relative to the housing 16 along the working axis 22. In the embodiment shown in FIG. 4, the anvil 18 is supported within an anvil block 50 for selectively controlled movement in directions along the working axis 22 by a servomotor, such as second servomotor 52 supported on the housing 16, or an additional servomotor. Accordingly, the position of the anvil 18 relative to the housing 16 may be adjusted based on information related to the position of the face plate 30 and the calculated or empirically determined spring-back of the sheet material. Such calculated or empirically determined spring-back of the sheet material used for varying the relative positions of the anvil 18 and/or face plate 30 may be associated with characteristics of the sheet material, such as thickness and/or material properties.

Figure 6:
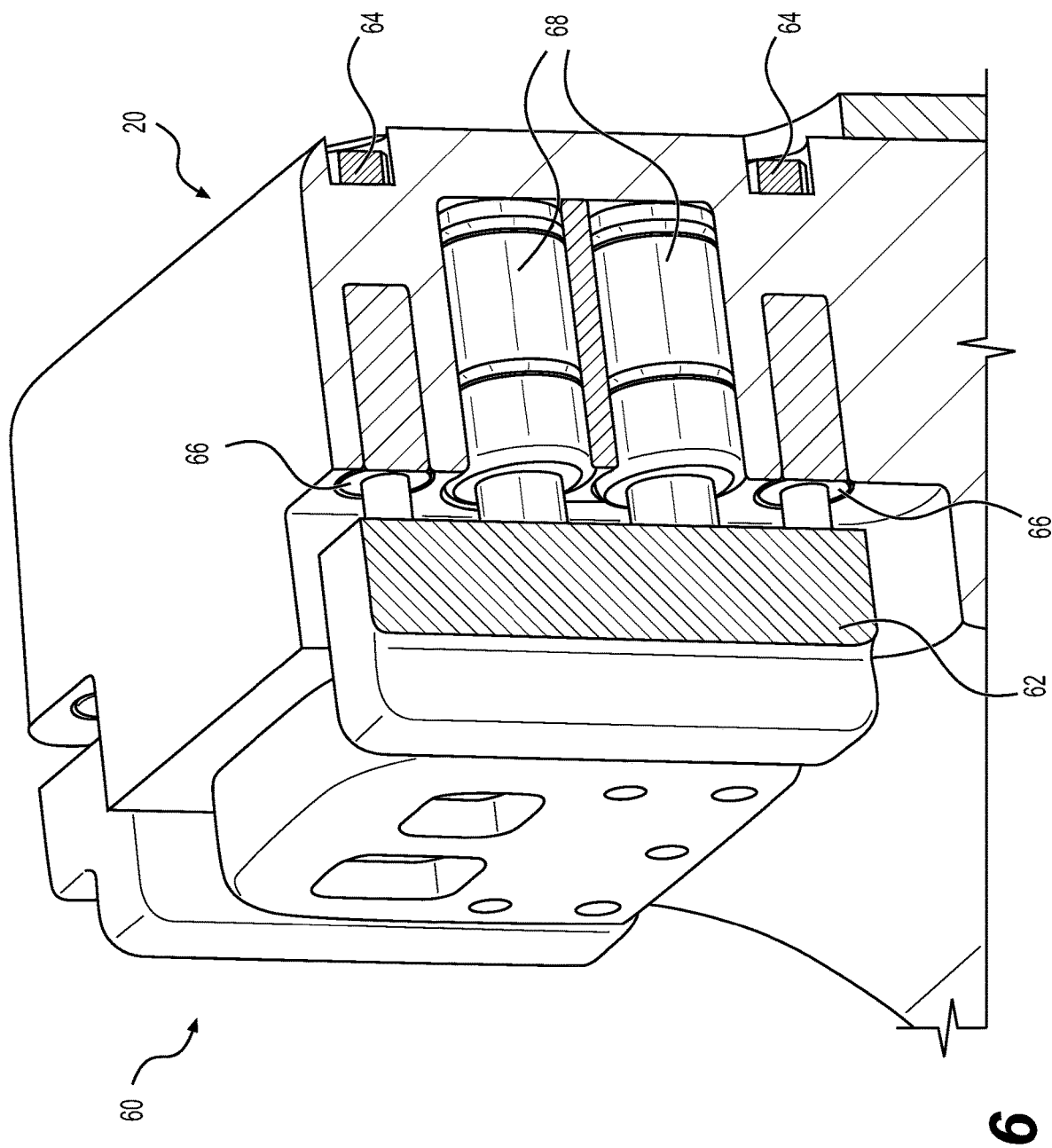
FIG. 6 is an enlarged detail view of the encircled area of FIG. 2.

With continued reference to FIGS. 2-3, and referring further to FIG. 6, the exemplary tool 12 in another embodiment may further include at least one workpiece clamp 60 on the die block 20 and positioned adjacent the forming die 34. In the embodiment shown, the tool 12 includes first and second workpiece clamps 60 positioned on opposite sides of the forming die 34 to support areas of the sheet material surrounding the pad that will be formed. As the die block 20 is moved in a direction toward the slide block 24 to displace the sheet material between the forming die 34, the anvil 18, and the face plate 30, the workpiece clamps 60 support portions of the sheet material laterally adjacent to the forming die 34 such that unwanted deformation of the sheet material outside of the formed pad is reduced and/or prevented. In addition to reducing or preventing unwanted deformation of the sheet material, the workpiece clamps 60 may also help to reduce spring-back of the sheet material after the pad is formed. As best seen in FIG. 6, each workpiece clamp 60 of this embodiment includes a clamp member 62 supported on the die block 20 by one or more positioning bolts 64 extending through the die block 20 and threaded into the clamp member 62. The positioning bolts 64 are slidably received in respective journals 66 provided in the die block 20 so that the clamp member 62 is moveable in directions aligned with the working axis 22 of the anvil 18.

The workpiece clamp 60 may further include one or more biasing members 68 operative to bias the clamp member 62 in a direction toward the slide member 24. In the embodiment shown, the biasing members 68 comprise gas springs, such as nitrogen gas spring cylinders Model No. U.0175.007.TO.180 available from DADCO, Inc. of Plymouth, Mich. The biasing members 68 in this embodiment are supported within corresponding pockets formed in the die block 20 such that the piston rods of the gas spring cylinders engage the respective clamp members 62. While the biasing members 68 have been shown and described in this exemplary embodiment as gas springs, it will be appreciated that various other structure or devices suitable for biasing the clamp members 62 in a direction toward the slide member 24 may alternatively be used.

With continued reference to FIGS. 2-3, and referring again to FIG. 4, another exemplary embodiment of a tool 12 for forming an attachment pad in sheet material includes a slide block 24 supported on the housing 16 for movement along the working axis 22 of the anvil 18, and additionally for movement in at least two more degrees of freedom. FIG. 4 illustrates a cross-sectional view through the slide block 24 along lines 4-4 of FIG. 2. In this embodiment, a roller bearing 80 is carried on the anvil 18 and supports the slide block 24 for translational movement along the working axis 22. To this end, the races of the roller bearing 80 may be fixed against rotation about working axis 22 such that only translation of the slide block 24 is permitted by roller bearing 80.

The tool 12 may further include a spherical bearing 82 supported on the roller bearing 80 and carrying the slide block 24. The spherical bearing 82 is movably supported within a bearing journal 84 and facilitates movement of the slide block 24 in additional degrees of freedom corresponding to pitch and yaw axes relative to the working axis 22. The ability of the slide block 24 to move in up to six degrees-of-freedom enables the face plate 30 carried on the slide block 24 to better accommodate angular variations of incoming sheet material so that the face plate 30 may seat flush against an incoming sheet material which may otherwise out of plane with the face plate 30.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A tool for forming an attachment pad on a sheet material, the tool comprising:
a housing;
an anvil supported on the housing and defining a working axis for forming the pad;

a slide block supported on the housing for movement at least along the working axis of the anvil;

a die block supported on the housing opposite the slide block and movable in directions along the working axis, the die block cooperating with anvil to form the pad;

an actuator on the housing and biasing the slide block in a direction toward the die block, the actuator configured to operate in a first mode wherein the slide block is movable toward and away from the die block, and a second mode wherein the slide block is locked against movement in a direction away from the die block; and a selectively adjustable counterbalance device configured to cooperate with the actuator in the first mode to counterbalance a force applied to the slide block by the actuator.

2. The tool of claim 1, wherein a counterbalance force of the counterbalance device is adjustable based on a pose of the tool.

3. The tool of claim 1, wherein the counterbalance force is adjustable based on a predetermined force limit that can be applied by the slide block to the sheet material.

4. The tool of claim 1, wherein the counterbalance device is positioned on the housing between the actuator and the slide block.

5. The tool of claim 1, further comprising:
a lever arm operatively coupled with the slide block;
the lever arm operable to transfer force to the slide block from at least one of the actuator or the counterbalance device.

6. The tool of claim 1, further comprising:
a face plate on the slide block; and
a forming die on the die block;
the face plate and forming die cooperating with the anvil to form the pad when the die block is moved along the working axis to engage the anvil.

7. The tool of claim 1, further comprising:
a sensor supported on the housing and configured to sense a position of at least one of the slide block or a face plate on the slide block, relative to the housing.

8. The tool of claim 7, wherein:
the anvil is selectively movable relative to the housing;
the sensor is operable to determine the position of the slide block relative to the anvil; and
the position of the anvil on the housing is adjustable to accommodate a spring-back of the sheet material based on the sensed position of the slide block.

9. The tool of claim 7, wherein:
the sensor is configured to sense a position of the slide block when contact is made with the sheet material;

a parameter associated with the sheet material is determined based on the sensed position;
a signal is generated/produced when the parameter reaches a predetermined threshold.

10. The tool of claim 1, further comprising:
a face plate on the slide block, the face plate cooperating with the anvil to form the pad; and
at least one workpiece clamp on the die block, the workpiece clamp cooperating with the face plate to clamp the sheet material therebetween when the die block is moved along the working axis to engage the anvil.

11. The tool of claim 10, wherein the at least one workpiece clamp is biased in a direction toward the face plate.

12. The tool of claim 10, wherein the at least one workpiece clamp is selectively positionably adjustable to vary a position of the workpiece clamp relative to the die block along directions parallel to the working axis.

13. The tool of claim 10, further comprising:
a forming die on the die block;
the forming die cooperating with the face plate and the anvil to form the pad when the die block is moved along the working axis to engage the anvil.

14. A tool for forming an attachment pad in a sheet material, the tool comprising:
a housing;
an anvil supported on the housing and defining a working axis for forming the pad;
a slide block supported on the housing for movement along the working axis of the anvil, and for further movement in up to six degrees of freedom about the working axis;
a die block supported on the housing opposite the slide block and movable in directions along the working axis, the die block cooperating with anvil to form pad; and
a locking mechanism on the housing, the locking mechanism actuatable to lock the slide block against movement along the working axis in a direction away from the die block.

15. The tool of claim 14, wherein:
the slide block is supported on the housing by a roller bearing such that the slide block is rotatable about a pivot axis of the roller bearing; and
the pivot axis is substantially aligned with the working axis.

16. The tool of claim 15, further comprising a spherical bearing disposed between the roller bearing and the slide block.

* * * * *